Figure 1:
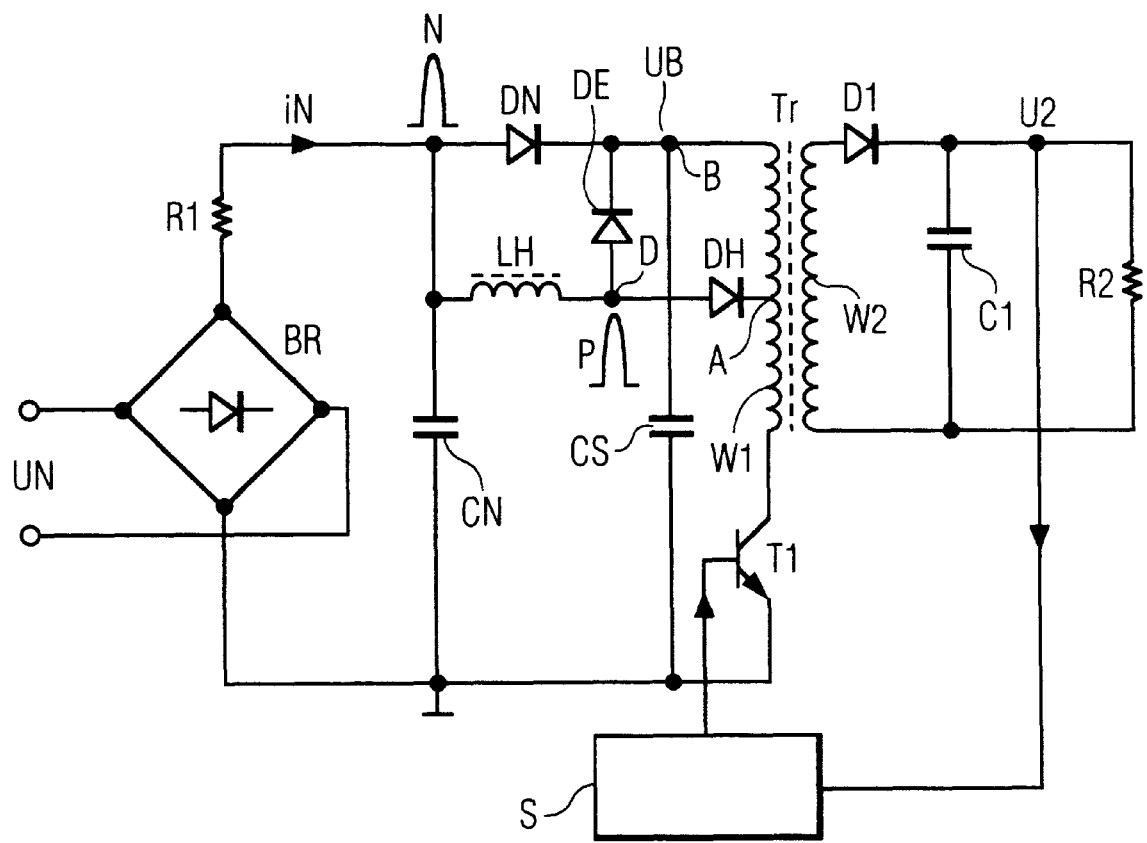

United States Patent [19]
Koegel et al.

[11] Patent Number: 6,088,242
[45] Date of Patent: Jul. 11, 2000

[54] SWITCHED-MODE POWER SUPPLY HAVING A REDUCED HARMONIC LOAD ON THE MAINS

[75] Inventors: Reinhard Koegel, Brigachtal; Jean-Paul Louvel, Villingen-Schwenningen, both of Germany

[73] Assignee: Deutsche Thomson-Brandt GmbH, Villingen-Schwenningen, Germany

[21] Appl. No.: 08/822,154

[22] Filed: Mar. 17, 1997

[30] Foreign Application Priority Data

Mar. 19, 1996 [DE] Germany ............................ 196 10 762

[51] Int. Cl.[7] ........................... H02M 3/335; H02M 3/24; H02M 7/537; H02H 7/122
[52] U.S. Cl. ................................. 363/21; 363/56; 363/95; 363/131
[58] Field of Search .................................. 363/21, 56, 19, 363/40, 41, 95, 131

[56] References Cited

U.S. PATENT DOCUMENTS

| | | | |
|---|---|---|---|
| 4,336,587 | 6/1982 | Boettcher, Jr. et al. | 363/56 |
| 4,782,436 | 11/1988 | Gilliland | 363/56 |
| 5,088,017 | 2/1992 | Yaginuma et al. | 363/21 |
| 5,119,262 | 6/1992 | Ikeuchi | 361/18 |
| 5,162,981 | 11/1992 | Lazar et al. | 363/22 |
| 5,390,099 | 2/1995 | Rilly et al. . | |
| 5,673,184 | 9/1997 | Rilly et al. | 363/21 |

FOREIGN PATENT DOCUMENTS

| | | | |
|---|---|---|---|
| 0653831 | 5/1995 | European Pat. Off. . | |
| 4008652 | 9/1991 | Germany . | |
| 4131240 | 3/1992 | Germany | H02M 3/28 |
| 4431120 | 3/1996 | Germany | H02M 1/12 |
| 92/92873 | 2/1992 | WIPO | H02M 1/00 |

OTHER PUBLICATIONS

European Search Report, dated Jun. 23, 1997.

*Primary Examiner*—Peter S. Wong
*Assistant Examiner*—Bao Q. Vu
*Attorney, Agent, or Firm*—Joseph S. Tripoli; Joseph J. Laks; Harvey D. Fried

[57] ABSTRACT

A switched mode power supplier having an improved power factor, that is to say a reduced harmonic load on the mains comprising a switch mode power supply with a reduced harmonic load on mains, comprising a mains rectifier being coupled to a charge capacitor and to a series circuit, the series circuit comprising a decoupling element, a primary winding of a transformer, a switching transistor, and an energy storage capacitor coupled in parallel with the primary winding and the switching transistor, with the voltage thereacross being a smoothed DC voltage, the charge capacitor being further coupled to a tap of said primary winding via a second series circuit comprising an inductor and a diode, and the inductor and the diode being connected via a second diode to a point with a fixed voltage.

4 Claims, 1 Drawing Sheet

SWITCHED-MODE POWER SUPPLY HAVING A REDUCED HARMONIC LOAD ON THE MAINS

The invention is based on a switched-mode power supply having a reduced harmonic load on the mains, according to the precharacterizing clause of claim 1. Such a switched-mode power supply is disclosed in DE-OS 44 31 120. This switched-mode power supply makes it possible with a relatively simple circuit to improve the so-called power factor significantly and effectively, that is to say to reduce the harmonics taken from the mains.

It has been found that, at the instant when the switching transistor switches off, a large voltage pulse is induced by the inductor as a result of the current being switched off, which voltage pulse passes via the primary winding of the isolating transformer to the collector of the switching transistor. This undesirable voltage pulse is also not reduced by the coupling of the isolating transformer, because the inductor is arranged on a core separated from the isolating transformer and is thus not coupled to the isolating transformer. This large voltage pulse on the one hand endangers the switching transistor and on the other hand produces undesirable interference radiation. If necessary, because of this voltage pulse, a more expensive switching transistor has to be used, with a higher voltage resistivity or withstand voltage. The problem of interference radiation still remains, however, in this case.

The invention is based on the object of developing a switched-mode power supply of the described type with simple circuit means such that the amplitude of the voltage pulse, and thus the interference radiation caused by it, are reduced, and a transistor with an increased withstand voltage is not necessary for the switching transistor.

This object is achieved by the invention specified in claim 1. Advantageous developments of the invention are specified in the subclaims.

The gist of the invention is that the junction point of the inductor and the diode is connected via a second diode to a point at a fixed voltage.

According to the invention, the voltage load on the switching transistor caused by the pulse induced on the inductor at the instant when the switching transistor switches off is considerably reduced. The switching transistor is then no longer endangered, and it is not necessary to use a switching transistor with an increased withstand voltage. The effect of the circuit in terms of increasing the power factor, that is to say reducing the harmonic load on the mains, is thus not adversely affected according to the invention. The circuit is also relatively simple and requires only a cost-effective commercially available diode, and no special diode.

The second diode is preferably connected to that end of the primary winding of the isolating transformer which is connected to the charge capacitor. The pulse voltage at the said junction point is then limited to the DC voltage at the end of the primary winding, whose value is not dangerous to the transistor. At the same time, the end of the primary winding is preferably connected to an energy-storage capacitor which is large in comparison with the charge capacitor, and is connected via a decoupling element to the charge capacitor. The decoupling element is in this case preferably formed by a diode.

The second diode can also be connected to any desired point at a fixed voltage. The voltage in this case must be large enough that the diode does not influence the rest of the effect of the circuit, particularly during the phase when the switching transistor is switched on, and nevertheless produces limiting at a sufficiently low value.

The invention is explained in the following text with reference to the drawing. The single FIGURE in the drawing shows the said known circuit with the solution according to the invention.

The FIGURE shows the layout of a switched-mode power supply. The illustration shows the mains voltage UN, the mains rectifier BR, the current limiting resistor R1, the charge capacitor CN, the isolating transformer Tr with the primary winding W1 and the secondary winding W2, the switching transistor T1, the diode D1 for producing the operating voltage U2 on the filter capacitor C1 for the load R2, and the control circuit S which is supplied from the secondary and controls the switching transistor T1 for the purpose of stabilizing the operating voltage U2. The charge capacitor CN and the energy-storage capacitor CS are decoupled from one another by the decoupling diode DN. In addition, the series circuit formed by the inductor LH and the diode DH is inserted between the charge capacitor CN and the tap A of the primary winding W1.

The voltage on the charge capacitor CN is a pulsating sinusoidal voltage, as a result of a correspondingly small charge capacitor CN, which sinusoidal voltage does not fall to zero, however, in the region of the zero crossings of UN, but has a constant value there. The voltage UB on the energy-storage capacitor CS, which is large in comparison with the charge capacitor CN, is a filtered DC voltage, which virtually does not drop during one half-cycle. The diode DN forms a first charging path for CS which, on its own, would produce an undesirable current, containing harmonics, however. The series circuit formed from LH and DH now forms a second charging path for CS. As a result of the particular selection of the value of LH and of the position of the tap A, an additional charging current flows in CS in the region of the maximum of UN. This charging current has a longer duration and a smaller amplitude than the charging current via DN, so that the current which is taken from the mains has a considerably lower harmonic content and is a better approximation to the ideal sinusoidal waveform. In the case of the circuit described so far, a positive voltage pulse P is produced at the point D by the inductor LH at the instant when the switching transistor T1 switches off, which voltage pulse P endangers the switching transistor T1 and produces undesirable interference radiation.

In addition, the point D is now connected via the diode DE to the point B, that is to say to the energy-storage capacitor CS. This results in it not being possible for the voltage pulse P at the point D to exceed the value of the voltage at the point B, apart from the minor forward voltage of about 0.7 volts of the diode DE. This means that the voltage pulse P at the point D is limited to the value of the voltage UB at the point B. This voltage UB is, however, not dangerous for the transistor T1 and also does not produce an excessively large amount of interference radiation.

The diode DE can also be connected between the point D and another point at a fixed voltage, which is roughly on the order of magnitude of the voltage UB.

What is claimed is:

1. A switch mode power supply with a reduced harmonic load on mains comprising:
   a mains rectifier,
   an output of the mains rectifier being coupled to a charge capacitor and to a series circuit,
   the series circuit comprising:
      a decoupling element,
      a primary winding of a transformer,
      a switching transistor, and
      an energy storage capacitor coupled in parallel with said primary winding and said switching transistor, with the voltage thereacross being a smoothed DC voltage,
   the charge capacitor being further coupled to a tap of said primary winding via a second series circuit comprising an inductor and a diode, and
   said inductor and said diode being connected via a second diode to a point with a fixed voltage.

2. The power supply according to claim 1, wherein said second diode is connected to an end of the primary winding which is connected to said charge capacitor.

3. The power supply according to claim 2, where said end of said primary winding is connected to said energy-storage capacitor having a large capacity in comparison with said charge capacitor, and which is connected via said decoupling element to said charge capacitor.

4. The power supply according to claim 3, wherein said decoupling element is formed by a diode.

* * * * *